(12) United States Patent
Nakatsuka

(10) Patent No.: US 8,842,327 B2
(45) Date of Patent: Sep. 23, 2014

(54) PRINT CONTROL APPARATUS, PRINT CONTROL METHOD, AND STORAGE MEDIUM STORING COMPUTER-EXECUTABLE PROGRAM

(75) Inventor: Tadanori Nakatsuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 344 days.

(21) Appl. No.: 13/142,034

(22) PCT Filed: Dec. 7, 2009

(86) PCT No.: PCT/JP2009/006660
§ 371 (c)(1),
(2), (4) Date: Jun. 24, 2011

(87) PCT Pub. No.: WO2010/073507
PCT Pub. Date: Jul. 1, 2010

(65) Prior Publication Data
US 2011/0261412 A1    Oct. 27, 2011

(30) Foreign Application Priority Data
Dec. 26, 2008 (JP) .................................. 2008-335040

(51) Int. Cl.
*G06K 15/00* (2006.01)
*G06F 3/12* (2006.01)
(52) U.S. Cl.
CPC ............ *G06F 3/1205* (2013.01); *G06F 3/1252* (2013.01); *G06F 3/1204* (2013.01); *G06F 3/1243* (2013.01)
USPC ........................... 358/1.18; 358/1.15; 358/2.1

(58) Field of Classification Search
USPC ............... 358/1.15, 1.18, 1.13, 1.9, 2.1, 1.16
See application file for complete search history.

(56) References Cited

U.S. PATENT DOCUMENTS

| 6,236,463 B1* | 5/2001 | Cyman et al. ................. 358/1.14 |
| 2001/0043359 A1* | 11/2001 | Mori et al. .................... 358/1.15 |
| 2006/0023238 A1* | 2/2006 | Blaszyk et al. .............. 358/1.13 |

FOREIGN PATENT DOCUMENTS

| EP | 895183 A2 | 2/1999 |
| JP | 98/62096 A1 | 7/1998 |
| JP | 11-099723 A | 4/1999 |
| JP | 2005-174260 A | 6/2005 |
| JP | 2005-313522 A | 11/2005 |

* cited by examiner

*Primary Examiner* — Vu B Hang
(74) *Attorney, Agent, or Firm* — Canon USA, Inc., IP Division

(57) ABSTRACT

A print control apparatus may include a determination unit and a print data generation unit to process variable data. The determination unit determines an imposition method used for defining layout of the variable data including a plurality of pages where stationary content used for a plurality of records and variable content that differs for each record are arranged on one physical page. The print data generation unit generates print data used for arranging the layout of the plurality pages and performs printing. The print data generation unit acquires information for identifying a physical page on which each page of each record included in the variable data is printed based on the variable data and the imposition method determined by the determination unit and generates the print data including the acquired information used for identifying the physical page on which each page of each record is printed.

16 Claims, 14 Drawing Sheets

*1001*

| *1002* | *1003* | *1004* | *1005* | *1006* | *1007* |
|---|---|---|---|---|---|
| RECORD ID | NAME | AGE | FILE NAME 1 | FILE NAME 2 | FILE NAME 3 |
| 1 | A | 24 | xxx.jpg | yyy.jpg | zzz.jpg |
| 2 | B | 30 | aaa.jpg | bbb.jpg | zzz.jpg |
| 3 | C | 42 | sss.jpg | ccc.jpg | zzz.jpg |
| 4 | D | 28 | xxx.jpg | bbb.jpg | ttt.jpg |
| 5 | E | 36 | aaa.jpg | yyy.jpg | ttt.jpg |

US 8,842,327 B2

PRINT CONTROL APPARATUS, PRINT CONTROL METHOD, AND STORAGE MEDIUM STORING COMPUTER-EXECUTABLE PROGRAM

CROSS REFERENCE TO RELATED APPLICATIONS

This application is a National Stage filing of PCT application No. PCT/JP2009/006660, filed Dec. 7, 2009, which claims priority from Japanese Patent Application No. 2008-335040, filed Dec. 26, 2008, all of which are hereby incorporated by reference herein in their entirety.

TECHNICAL FIELD

The present invention relates to a print control apparatus, a print control method, and a computer-executable program.

BACKGROUND ART

Variable data includes stationary content such as a cover or a main text and variable content that varies depending on a record. The record is individual data of an individual person. Information of the records is contained in a database.

When the variable data is printed, the stationary content and the "variable content depending on the record" that is obtained from the database are combined and the obtained result is printed. Additionally, when the variable data is printed, in order to reduce costs such as paper fee and maintenance fee, imposition of data of a plurality of pages on a sheet is performed. For example, a plurality of postcard-size prints or tickets are printed on an A3-size sheet, and then the printed product is cut out.

Physical imposition data that is used for bookbinding printing includes all information that is necessary in the imposition of the document to be printed. Conventionally, in generating physical imposition data using POD (print on demand) printing, how to perform the imposition of each page of a document on a sheet is designated by a user. In other words, conventionally, the imposition information designated by the user is reflected in the physical imposition data. The physical imposition data, which is generated by application software, is transmitted to a printing apparatus and printed (see Japanese Patent Application Laid-Open No. 11-99723).

A format called PDF (Portable Document Format) is known as a format for print data. PDF data according to variable-data standard includes physical imposition data. The physical imposition data includes stationary content and variable content that varies according to each record. The stationary content and the variable content are arranged in order.

Printing of a specific record is essential in printing only the variable data. This is because a great demand exists for, for example, test printing or additional printing of a specific record. There is also a demand to acquire a printed record of a branch office from among data generated by a head office. Thus, the above-described PDF data according to variable-data standard includes information of a first page of each record.

CITATION LIST

Patent Literature

PTL 1: Japanese Patent Application Laid-Open No. 11-99723

SUMMARY OF INVENTION

According to an aspect of the present invention, a print control apparatus configured to process variable data includes a determination unit configured to determine an imposition method used for defining layout of the variable data including a plurality of pages where stationary content used for a plurality of records and variable content that differs for each record are arranged on one physical page, and a print data generation unit configured to generate print data used for arranging the layout of the plurality pages of the variable data on the one physical page by the imposition method determined by the determination unit and perform printing, and the print data generation unit generates the print data including information used for identifying each page of each record.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

First, a presupposed technique of the present invention is described below.

According to the technique discussed in Japanese Patent Application Laid-Open No. 11-99723, the variable data cannot be printed for each record. Further, as to the above-described PDF data according to variable-data standard, the user is unable to know the position where each record of the variable data is printed when the user performs imposition printing. The imposition printing is a printing method for printing a plurality of logical pages on one sheet of physical page (paper) (referred to as N-up printing in the description below). Thus, the user is unable to print a specific record.

Figure 3:
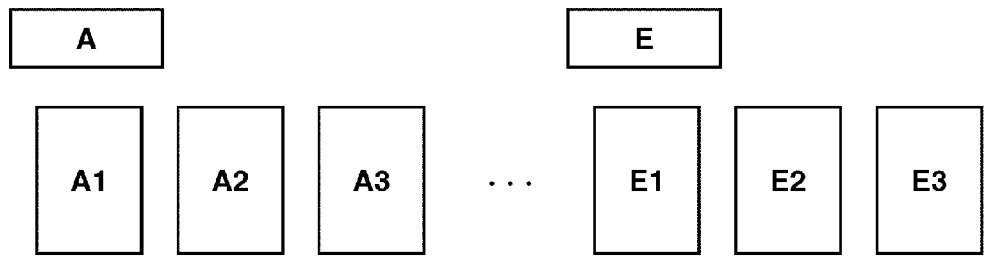
FIG. 3 is a conceptual illustration of an example of a record according to a first exemplary embodiment of the present invention.
Figure 4:
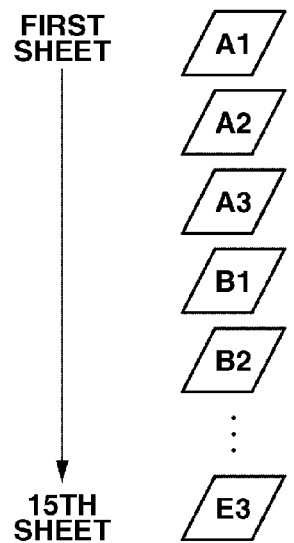
FIG. 4 is a conceptual illustration of a print product when one logical page of a record illustrated in FIG. 3 is printed on one physical page according to the first exemplary embodiment of the present invention.

FIG. 3 is a conceptual illustration of an example of a record. In FIG. 3, each record included in the variable data contains data of three pages. A total of five records, each for persons A to E, are included in the variable data. When one page (i.e., one logical page) of the variable data illustrated in FIG. 3 is printed on one sheet (one physical page) of paper, then a print product such as the one illustrated in FIG. 4 is obtained. FIG. 4 is a conceptual illustration of a print product when one logical page of a record illustrated in FIG. 3 is printed on one physical page.

When one logical page is printed on one physical page, if the first page of each record and the total number of pages (three pages according to the examples illustrated in FIGS. 3 and 4) are determined, it is possible to print each record individually. For example, in a case of printing B's record, three pages from the first page of B's record will be printed.

Figure 5:
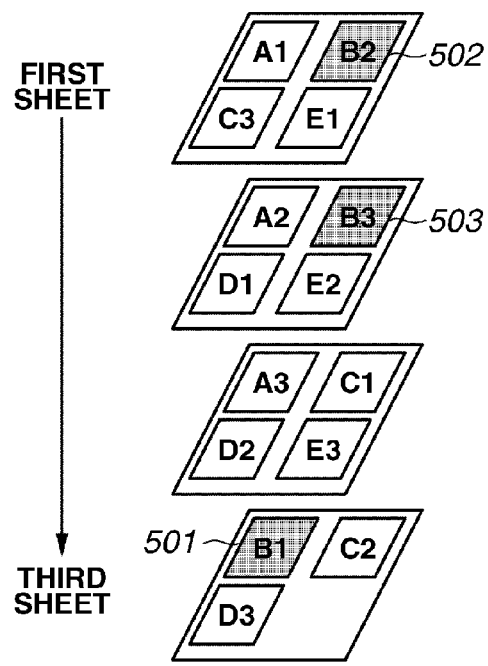
FIG. 5 is a conceptual illustration of an example of a print product when cut & stack printing is performed according to the first exemplary embodiment of the present invention.

Next, a case of imposition printing where a plurality of pages are printed on one sheet of paper will be described. FIG. 5 is a conceptual illustration of an example of a print product when cut & stack printing is performed. In FIG. 5, data of four pages is printed on one sheet of paper according to the cut & stack printing.

In FIG. 5, a first page 501 of B's record is printed on the fourth sheet, a second page 502 is printed on the first sheet, and a third page 503 is printed on the second sheet. According to the above-described PDF standard for variable data printing, since only the information of the first page 501 is obtained, all the pages of B's record cannot be printed. This kind of problem is not limited to the cut & stack printing and is a common problem in the imposition printing (N-up printing) that is used in printing a plurality of pages on one sheet of paper.

Figure 6:
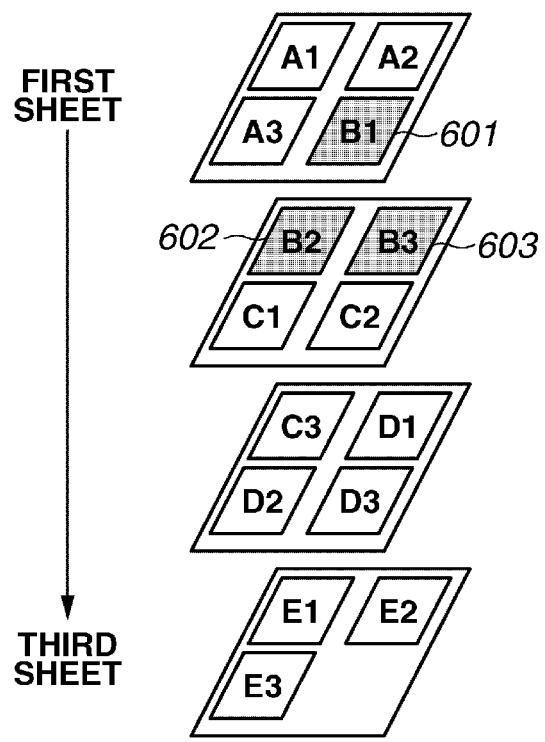
FIG. 6 is a conceptual illustration of an example of a print product when imposition printing other than the cut & stack printing is performed according to the first exemplary embodiment of the present invention.

FIG. 6 is a conceptual illustration of an example of a print product when imposition printing other than the cut & stack printing is performed. According to the example in FIG. 6, a first page 601 of B's record is printed on the first sheet, and a second page 602 and a third page 603 are printed on the second sheet. Regarding the above-described PDF data according to variable-data standard, since only the information of the first page 601 is obtained, all the pages of B's record cannot be printed as in the case illustrated in FIG. 5.

Example 1

A first exemplary embodiment of the present invention will now be described referring to the drawings.

Figure 1:
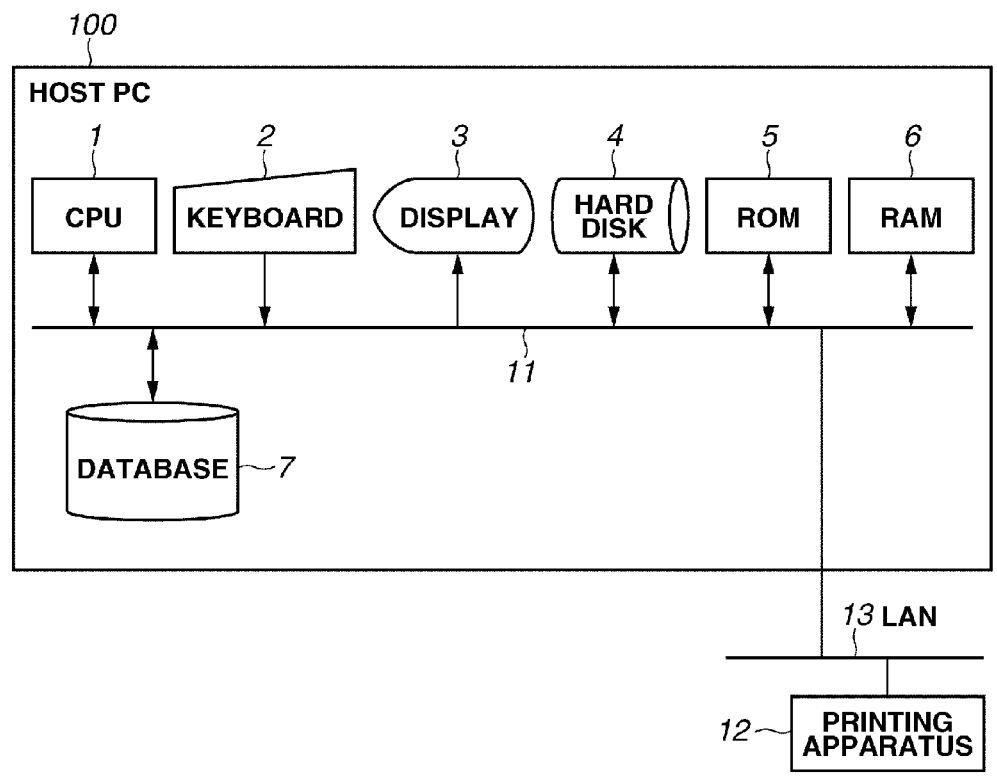
FIG. 1 illustrates an example of a hardware configuration of a variable data print system according to a first exemplary embodiment of the present invention.

FIG. 1 illustrates an example of a hardware configuration of a variable data print system.

In FIG. 1, the variable data print system includes a host PC 100 and a printing apparatus 12, each of which is connected to a local area network (LAN) 13 so that mutual communication is possible.

A central processing unit (CPU) 1 controls overall operation of the host PC 100 by executing a program stored in a hard disk 4 or a read-only memory (ROM) 5. A keyboard 2 is a user interface which a user uses in inputting data. A display 3 is used for displaying a document image. A program used for controlling the host PC 100 as well as a document is stored in the hard disk 4. A program used for controlling the host PC 100 as well as necessary information is stored in advance in the ROM 5. A random access memory (RAM) 6 is a storage device used as a working area. A database 7 contains record information of each record included in the variable data. All of these units are connected via a data bus 11. The data bus 11 is used for transferring various data.

The printing apparatus 12 performs printing based on the variable print data sent from the host PC 100. The printing apparatus 12 is, for example, a digital multifunction peripheral (MFP).

Figure 2:
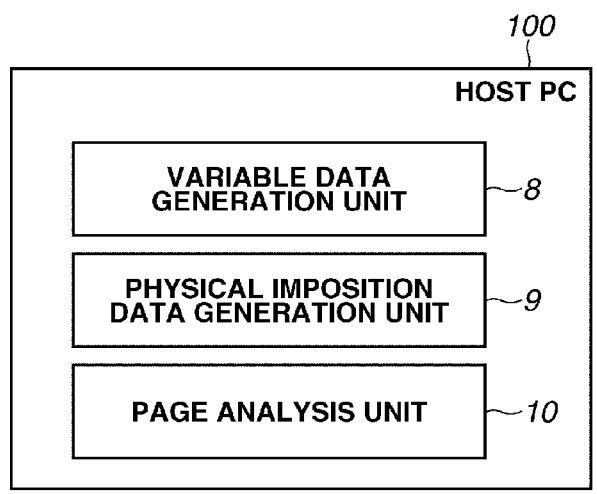
FIG. 2 illustrates an example of a functional configuration of a host personal computer (PC) capable of printing variable data (print data) for each record according to the first exemplary embodiment of the present invention.

FIG. 2 illustrates an example of a functional configuration of the host PC 100 that is capable of printing the variable data (print data) for each record.

In FIG. 2, a variable data generation unit 8 functions as a unit for generating the variable data. A physical imposition data generation unit 9 functions as a unit for generating physical imposition data (print data) used for the imposition of a specific record of the variable data generated by the variable data generation unit 8 on a physical page to print the specific record. A page analysis unit 10 analyzes a relation between the record and the physical imposition data.

As described above, FIG. 5 illustrates a print product where data of four pages, which is taken from the variable data that includes five records, is printed on one sheet of paper according to the cut & stack printing. Each record contains three pages of data. In FIG. 5, the first page 501 of B's record is printed on the fourth sheet, the second page 502 is printed on the first sheet, and the third page 503 is printed on the second sheet.

Further, as described above, FIG. 6 illustrates a print product where data of four pages, which is taken from the variable data that includes five records, is printed by imposition printing on one sheet of paper according to a printing method other than the cut & stack printing. Each record contains three pages of data. In FIG. 6, the first page 601 of B's record is printed on the first sheet, and the second page 602 and the third page 603 are printed on the second sheet.

Figure 7:
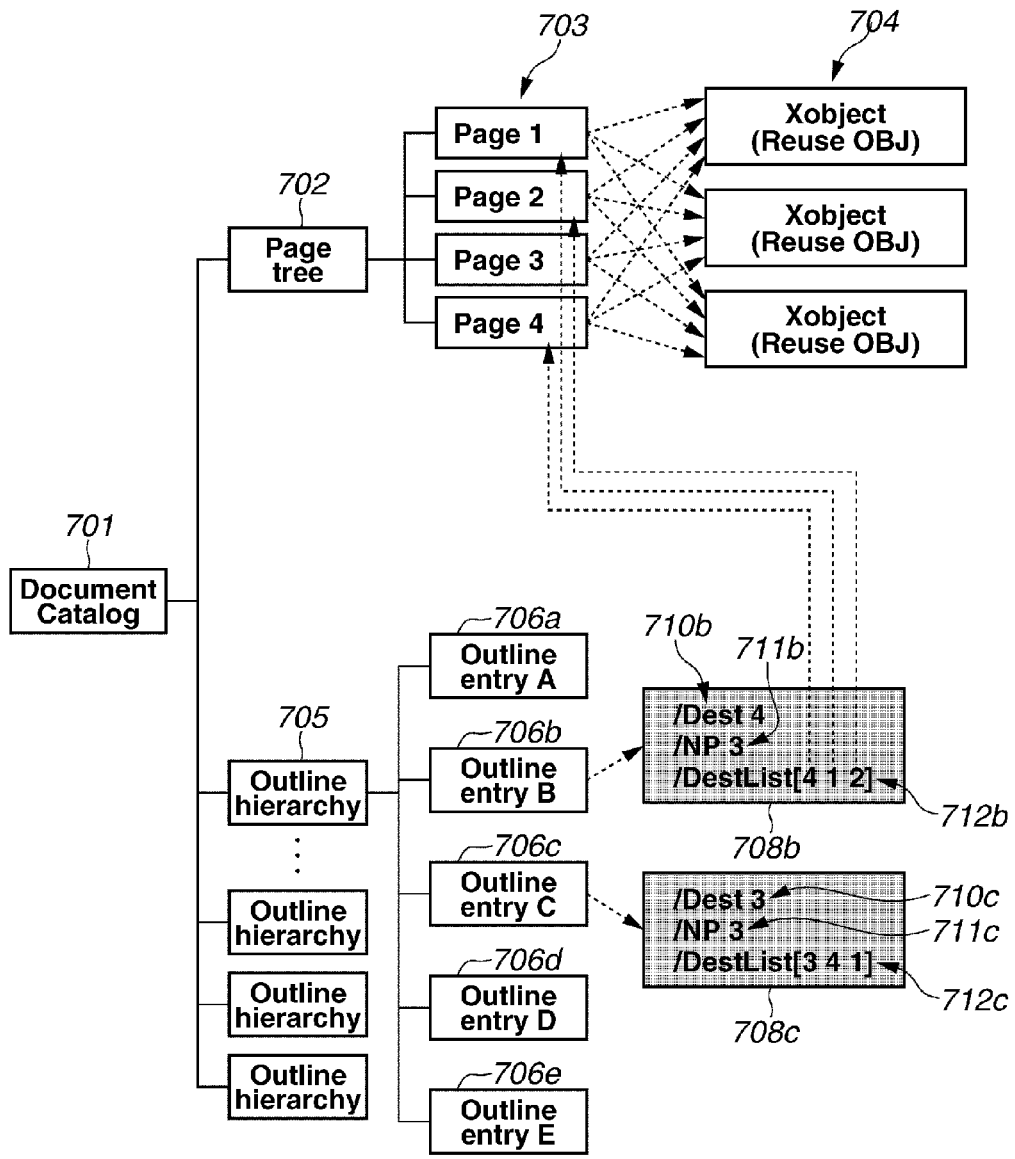
FIG. 7 illustrates an example of the variable print data used for obtaining the 2 print product illustrated in FIG. 5 according to the first exemplary embodiment of the present invention.

FIG. 7 illustrates an example of the variable print data used for obtaining the print product illustrated in FIG. 5. According to the present embodiment, the variable print data is print data based on PDF (PDF data).

A PDF document has a hierarchical structure. A Document Catalog 701 is the root of the hierarchy. A Page tree 702 is branched into page information. A Page 703 includes information of a configuration of each page. An Xobject 704 represents a rendering object used in a page. The Xobject 704 is a rendering object that is commonly used by each page and is also called a reusable object. As can be seen from FIG. 7, the Xobject 704 is referenced by all pages from Page 1 to Page 4.

An Outline hierarchy 705 indicates a position of a first page of each record. Outline entries A 706*a*, B 706*b*, C 706*c*, D 706*d*, and E 706*e* include information of a position of a first page and a total number of pages of the records of A to E. For example, data 708*b*, which is the actual content of the Outline entry B 706*b*, includes a first page position 710*b*, a total number of pages 711*b*, and page a list 712*b*. Further, data 708*c*, which is the actual content of the Outline entry C 706*c*, includes a first page position 710*c*, a total number of page 711*c*, and a page list 712*c*. According to the present embodiment, information included in a page list 712 indicates what page number of the physical pages (sheets) the corresponding record is actually printed on.

Figure 8:
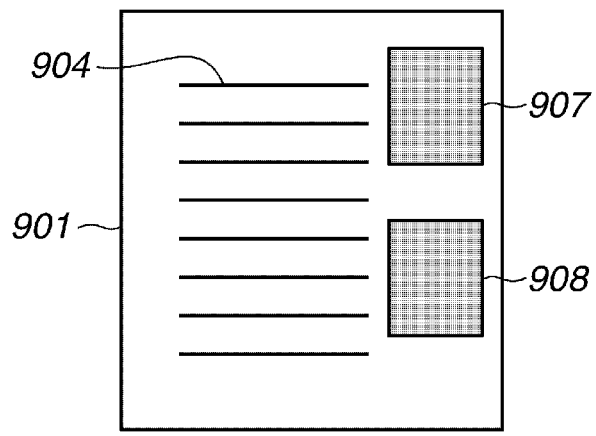
FIG. 8 illustrates an example of the variable data according to the first exemplary embodiment of the present invention.
Figure 8:
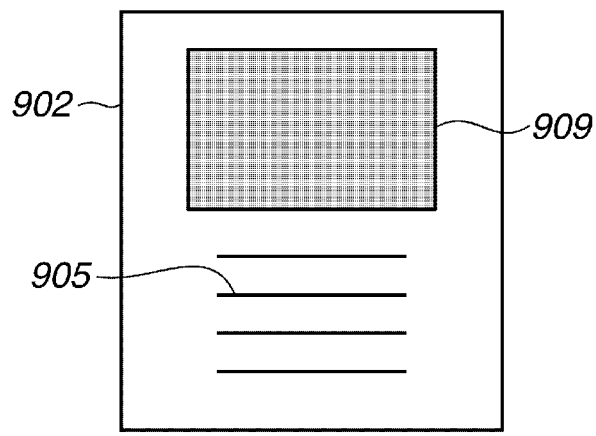
Figure 8:
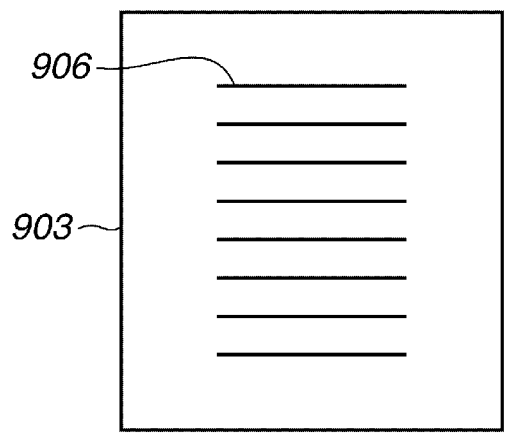

FIG. 8 illustrates an example of the variable data. In FIG. 8 each page is illustrated schematically.

As described above, one record contains three pages of data. A first page 901, a second page 902, and a third page 903 represent a first page, a second page, and a third page of a record, respectively. Documents 904, 905, and 906 are stationary content. They do not change according to the record. Images 907, 908, and 909 are variable content. They change according to the record.

Figures 9, 10:
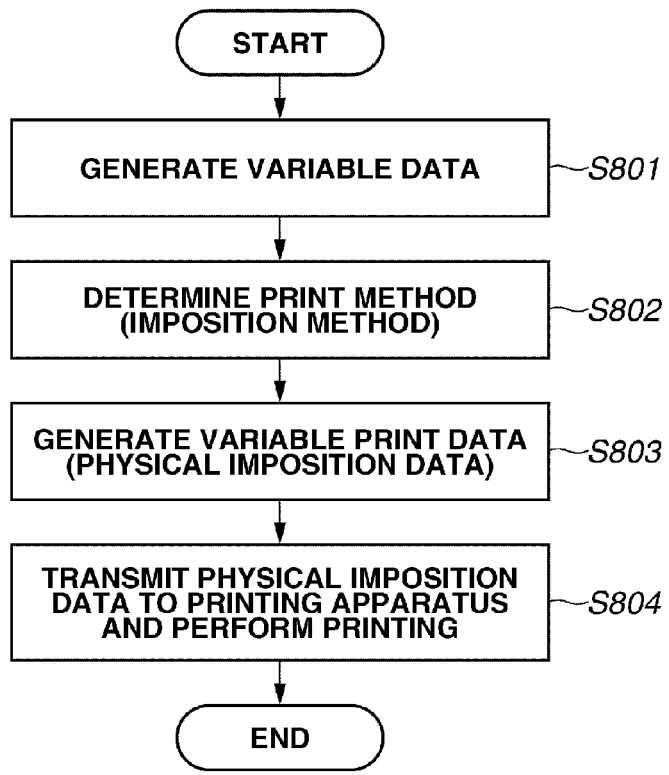
FIG. 9 illustrates an example of record information contained in a database according to the first exemplary embodiment of the present invention.
FIG. 10 is a flowchart illustrating, as an example, entire processing of the variable data print system when the variable data is generated and printed according to the first exemplary embodiment of the present invention.

FIG. 9 illustrates an example of the record information contained in the database 7.

In FIG. 9, record information 1001 includes a record ID 1002, a name 1003, an age 1004, and file names 1005, 1006, and 1007 which are file names of the images 907, 908, and 909 (the variable contents).

Operation of the variable data print system (including the variable data generation unit 8, the physical imposition data generation unit 9, and the page analysis unit 10) when it generates the variable data and the print data (physical imposition data) in order from the delivered document and prints the document, will now be described in detail.

FIG. 10 is a flowchart illustrating an example of the whole processing of the variable data print system when the variable data is generated and printed.

First, in step S801, the variable data generation unit 8 generates the variable data.

The variable data generation unit 8 renders the documents 904, 905, and 906 and the images 907, 908, and 909 on the display 3 according to the user's operation of the keyboard 2. Then, the variable data generation unit 8 determines the layout of the rendered documents 904, 905, and 906, and the images 907, 908, and 909 according to the user's operation of the keyboard 2, and stores the information in the hard disk 4.

As described above, according to the present embodiment, the documents 904, 905, and 906 are defined as the stationary content (stationary data) and the images 907, 908, and 909 are defined as the variable content (variable data). The image to be used for each record is determined based on the record information 1001 stored in the database 7.

For example, regarding the variable printing of A whose record ID 1002 is "1", a file name of "xxx.jpg" is used for the image 907 arranged on the first page and an image having a file name of "yyy.jpg" is used for the image 908 also arranged on the first page. Regarding the second page of the variable printing of A, an image having a file name of "zzz.jpg" is used for the image 909 arranged on the second page. Similarly, regarding the variable printing of B, a file name of "aaa.jpg" is used for the image 907 arranged on the first page and an image having a file name of "bbb.jpg" is used for the image 908 also arranged on the first page. Regarding the second page of the variable printing of B, an image having a file name of "zzz.jpg" is used for the image 909 arranged on the second page.

Thus, according to the present embodiment, the variable data is generated by the variable data generation unit in step S801.

In step S802, the physical imposition data generation unit 9 determines the printing method (imposition method) according to the user's operation of the keyboard 2.

Various printing methods can be used in the printing. For example, as illustrated in FIG. 4, each page (each logical page) can be printed on one sheet (one physical page). Further, there is the cut & stack printing. According to the cut & stack printing, four pages (four logical pages) are printed on one sheet as illustrated in FIG. 5. The printed sheets are cut and stacked. Accordingly, cut sheets are stacked in the order of pages.

The printing method is described below referring to the case where the cut & stack printing illustrated in FIG. 5 is performed.

In FIG. 5, A1 represents the first page 901 of the variable data of a person having "1" as the record ID 1002 of the record information 1001 and "A" as the name 1003. Similarly, B1 (the first page 501 of B's record) represents the first page 901 of the variable data of B and B2 (the second page 502 of B's record) represents the second page 902 of the variable data of B. Further, B3 (the third page 503 of B's record) represents the third page 903 of the variable data of B. Since the cut & stack printing is performed in FIG. 5, the first page 501 of B's record is printed on the fourth sheet, the second page 502 is printed on the first sheet, and the third page 503 is printed on the second sheet.

Figure 11:
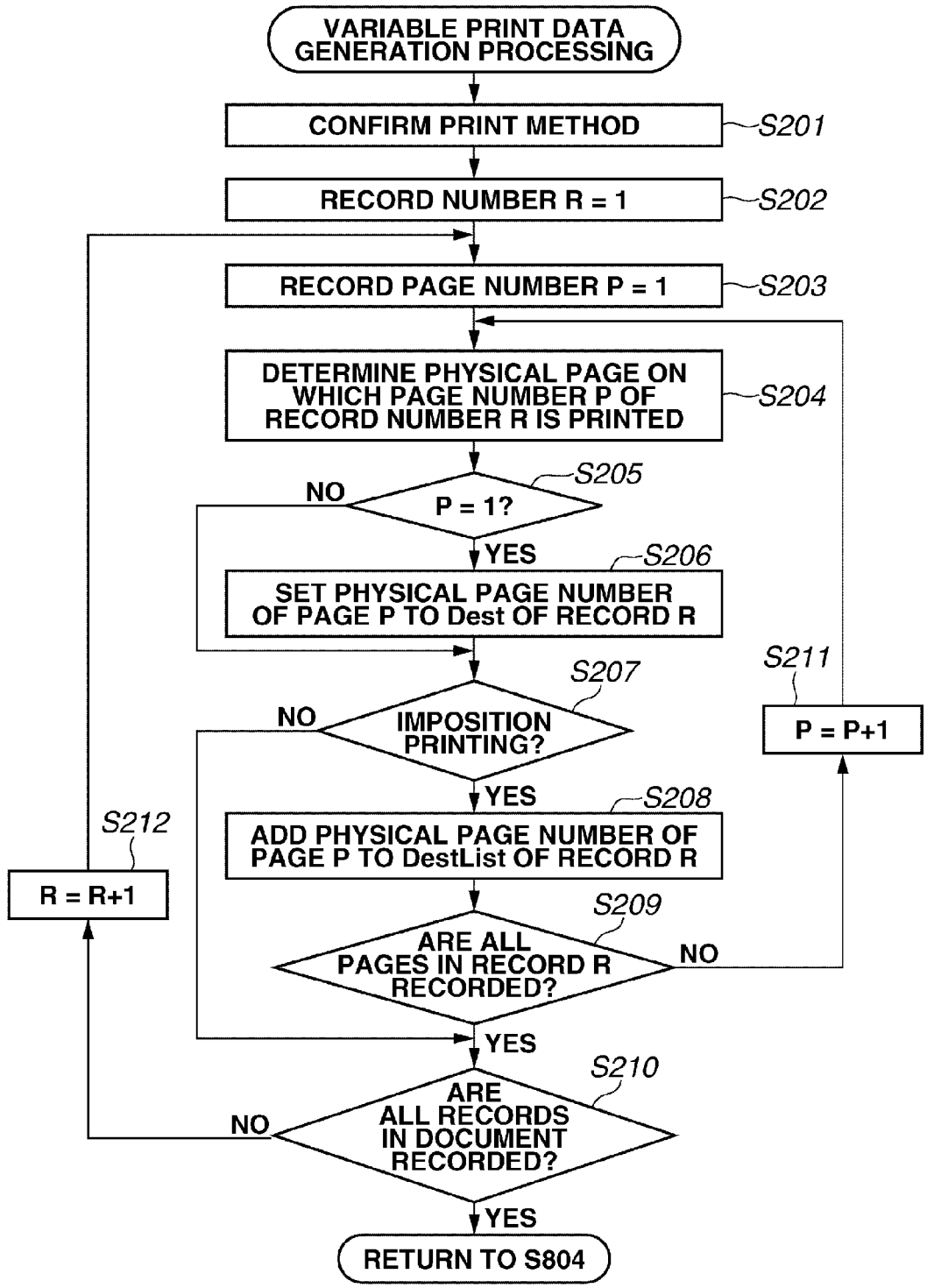
FIG. 11 is a flowchart illustrating in detail an example of variable print data generation processing in step S803 in FIG. 10 according to the first exemplary embodiment of the present invention.

In step S803, the physical imposition data generation unit 9 and the page analysis unit 10 generate the print data (physical imposition data). FIG. 11 is a flowchart illustrating in detail an example of the variable print data generation processing in step S803 of FIG. 10. As described above, the physical imposition data in FIG. 11 is PDF data. The processing illustrated in FIG. 11 is performed mainly by the physical imposition data generation unit 9. However, analysis of the arrangement of the page to be printed on the physical page, which is performed in step S204, is performed by the page analysis unit 10.

In step S201 in FIG. 11, the physical imposition data generation unit 9 confirms the printing method determined in step S802. In this case, the cut & stack printing illustrated in FIG. 5 is determined as the printing method. Thus, the print data used for printing the variable data, which includes five records each of which contains three pages of data and is printed in 4-up printing (four pages are printed on one sheet) of cut & stack, is generated.

In step S202, the physical imposition data generation unit 9 initializes a record number R to "1".

In step S203, the physical imposition data generation unit 9 initializes a record page number P to "1".

In step S204, the page analysis unit 10 determines the physical page on which the page having the record page number P in the record having the record number R is finally printed. In the following description, the obtained physical page is referred to as a physical page number. The physical page number is obtained based on the variable data generated in step S801 and the printing method determined in step S802. For example, since the first page 501 of B's record is printed on the fourth page of the physical pages, its physical page number is "4".

In step S205, the physical imposition data generation unit 9 determines whether the record page number P is "1". In other words, the physical imposition data generation unit 9 determines whether the page to be processed is the first page of the record to be processed. As a result of the determination, if the page to be processed is the first page (YES in step S205), the process proceeds to step S206. If the page to be processed is not the first page (NO in step S205), then the process proceeds to step S207. In this case, since B's record is the first page 501, the process proceeds to step S206.

In step S206, the page analysis unit 10 sets the physical page number of the record page number P to a first page position (Dest) 710 of an Outline entry 706 of the record number R. For example, since the first page 501 of B's record is on the fourth physical page, the page analysis unit 10 sets the first page position (Dest) 710b of the Outline entry B 706b of the OutLine hierarchy 705 to "4". Further, the page analysis unit 10 sets the total number of pages of the record having the record number R to a total number of pages (NP) 711 of the Outline entry 706 of the record having the record number R. For example, the page analysis unit 10 sets "3" to the total number of pages (NP) 711b of the Outline entry B 706b of the record having the record number R.

In step S207, the physical imposition data generation unit 9 determines whether the printing method determined in step S802 in FIG. 8 is imposition printing. As described above, the imposition printing is a printing method that allows imposition layout of a plurality of logical pages on one physical page. The imposition printing is also called N-up printing (N is a natural number and also a number of logical pages that is printed on one physical page. In the case illustrated in FIG. 5, it is 4-up printing).

As a result of the determination, if the printing method is the imposition printing (YES in step S207), the process proceeds to step S208. If the printing method is not the imposition printing (NO in step S207), then the process proceeds to step S210 without proceeding to step S208 and S209. Since the cut & stack printing, which is one type of imposition printing, is determined as the printing method in this case, the process proceeds to step S208.

In step S208, the page analysis unit 10 additionally sets the physical page number having the record page number P to the page list (DestList) 712 of the Outline entry 706 of the record number R. For example, since the first page 501 (the first page 901 in the layout) of B's record is printed on the fourth page of the physical pages, "4" is set to the page list (DestList) 712b of the Outline entry B 706b of the OutLine hierarchy 705.

Further, in processing the second page 502 (the second page 902 in the layout) of B's record, "1" is added to the page list (DestList) 712b of the Outline entry B 706b of the OutLine hierarchy 705. Similarly, in processing the third page 503 (the third page 903 in the layout) of B's record, "2" is added to the page list (DestList) 712b of the Outline entry B 706b of the OutLine hierarchy 705.

In this way, [4 1 2] is set to the page list (DestList) 712b that shows a relation between a page in B's record and the physical page, and all the necessary information is set to the page list (DestList) 712b. Similarly, [3 4 1] is set to the page list (DestList) 712c of the Outline entry C 706c of the OutLine hierarchy 705 for C's record. By referring to the page list (DestList) 712, the printing apparatus 12 can identify the physical page on which each page of each record is actually printed.

In step S209, the physical imposition data generation unit 9 determines whether the content of data 708 is set regarding all the pages in the record having the record number R. As a result, if it is determined that the content of the data 708 is set regarding all the pages in the record (YES in step S209), the generation of "the first page position (Dest) 710, the total number of pages (NP) 711, and the page list (DestList) 712" of the record to be processed ends and the process proceeds to step S210. If the content of the data 708 is not set regarding all the pages in the record (NO in step S209), then the process proceeds to step S211.

In step S210, the physical imposition data generation unit 9 determines whether the content of the data 708 is set regarding all the records to be processed in the document. As a result, if it is determined that the content of the data 708 is set regarding all the records to be processed (YES in step S210), the generation of "the first page position (Dest) 710, the total number of pages (NP) 711, and the page list (DestList) 712" of the records to be processed ends. Thus, the process of the flowchart illustrated in FIG. 11 ends, and the process proceeds to step S804 in FIG. 10. On the other hand, if all the content of the data 708 is still not set regarding all the records to be processed, then the process proceeds to step S212.

If the process proceeds from step S209 to S211 as described above, the physical imposition data generation unit 9 adds "1" to the record page number P, and performs processing of a page having the next page number, and then the process returns to step S204. For example, if the processing of the first page 501 (the first page 901 in the layout) of B's record is completed, processing of the page having the page number "2" ("1" added to the current record page number P (=1)) will be performed in step S204. Then, in step S204, the page analysis unit 10 determines the physical page on which the second page 502 (the second page 902 in the layout) of B's record is printed.

Further, if the process proceeds from step S210 to S212, the physical imposition data generation unit 9 adds "1" to the record number R, and performs processing of a record having the next record number. For example, if the processing of B's record is completed, then "1" will be added to the current record number R ("2" in this case) and a record having the record number "3" will be processed. Then, the process returns to step S203. In step S203, the processing of C's record will be performed starting from C's first page.

According to the present embodiment, by performing the process in step S803, for example, an example of the print data generation unit is realized.

When the process in step S803 that is described in detail in FIG. 9 ends, the process proceeds to step S804 in FIG. 10.

In step S804, the physical imposition data (PDF data) that is generated as described above is sent from the host PC 100 to the printing apparatus 12. The printing apparatus 12 performs printing based on the obtained physical imposition data.

If the printing method is not the imposition printing, the printing apparatus 12 prints all the pages in order starting from the Page 703 that is in the lower level of the hierarchy than the Page tree 702 of the Document Catalog 701.

Figure 12:
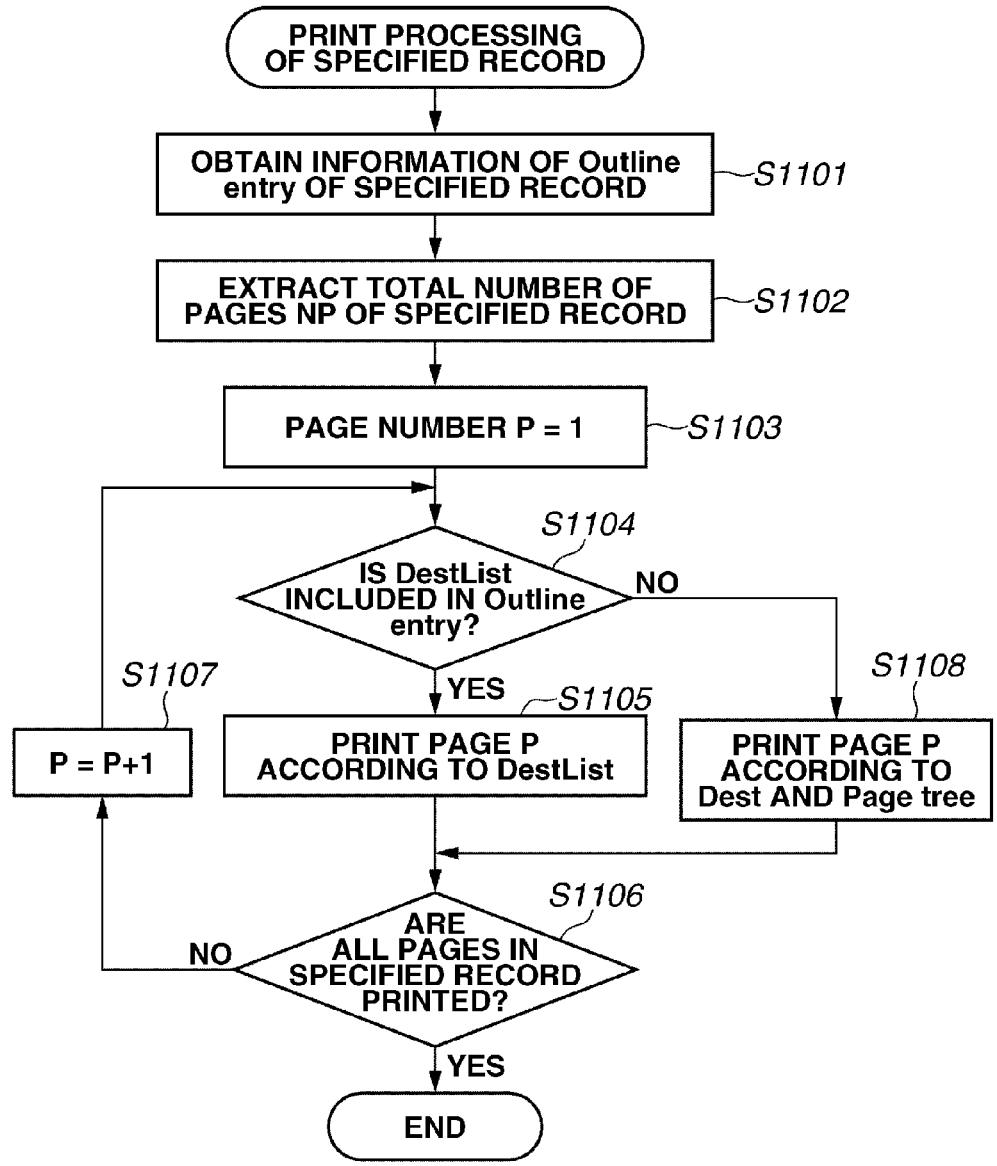
FIG. 12 is a flowchart illustrating an example of processing of the printing apparatus when a specific record out of a plurality of records is determined to be printed by imposition printing according to the first exemplary embodiment of the present invention.

On the other hand, if the imposition printing of a specific record out of a plurality of records is designated, the printing apparatus 12 performs the print processing based on the flowchart illustrated in FIG. 12. This processing is a distinctive feature of the present embodiment. The flowchart in FIG. 12 illustrates an example of the processing of the printing apparatus 12 when a specific record out of a plurality of records is determined to be printed by the imposition printing. The specific record can be one record or a plurality of records.

In step S1101 in FIG. 12, the printing apparatus 12 obtains information of the Outline entry 706 of the specific record. Since printing of B's record is designated in the flowchart in FIG. 12, the printing apparatus 12 obtains information of the Outline entry B 706b of the Outline hierarchy 705.

In step S1102, the printing apparatus 12 extracts the total number of pages (NP) 711 of the specific record. Since B's record is printed in this case, the total number of pages (NP) 711b (i.e., "3" in this case) of the Outline entry B 706b of the Outline hierarchy 705 is extracted. In this way, the printing apparatus 12 determines that the total number of pages of B's record is three.

In step S1103, the printing apparatus 12 sets the page number P to "1". In step S1104, the printing apparatus 12 determines whether the page list (DestList) 712 is included in the Outline entry 706 of the Outline hierarchy 705 of the specific record. If the page list (DestList) 712 is included (YES in step S1104), the process proceeds to step S1105. If the page list (DestList) 712 is not included (NO in step S1104), then the process proceeds to step S1108. Since the page list (DestList) 712b is included in the Outline entry B 706 of the Outline hierarchy 705 of B's record in this case, the process proceeds to step S1105.

In step S1105, the printing apparatus 12 prints the page of the page number P according to the content of the page list (DestList) 712. From the value of the page list (DestList) 712b, the first page 501 (the first page 901 in the layout) of B's record is determined as the fourth page of the physical pages. Thus, the printing apparatus 12 extracts the data of the fourth page of the physical pages from the physical imposition data (PDF data) and performs printing based on the extracted data.

Further, from the value of the page list (DestList) 712b, the second page 502 (the second page 902 in the layout) of B's record is determined as the first page of the physical pages. Thus, the printing apparatus 12 extracts the data of the first page of the physical pages from the physical imposition data (PDF data) and executes printing based on the extracted data. Similarly, regarding the third page 503 (the third page 903 in the layout) of B's record, printing based on the second page of the physical pages is executed.

Similarly, if printing of C's record is designated, the value of the DestList 712c of the Outline entry C 706c of the OutLine hierarchy 705 will be [3 4 1]. Thus, printing of the third, the fourth, and the first pages of the physical pages will be performed.

When the process in step S1105 ends, the process proceeds to step S1106. In step S1106, the printing apparatus 12 determines whether all the pages in the specific record are printed. As a result, if it is determined that printing of all the pages in the specific record is completed (YES in step S1106), the processing (print processing) of the flowchart in FIG. 12 ends. If printing of all the pages in the specific record is not completed (NO in step S1106), then the process proceeds to step S1107.

In step S1107, the printing apparatus 12 adds "1" to the current page number P and proceeds to the print processing of the next page. For example, if the printing of the first page 501 (the first page 901 in the layout) of B's record is completed, processing of the page having the page number "2" ("1" added to the current record page number P (=1)) will be performed in step S1104. Then, print processing similar to that of the first page 501 (the first page 901 in the layout) will be performed for the second page 502 (the second page 902 in the layout).

As described above, in step S1104, if the page list (DestList) 712 is determined as not included in the Outline entry 706 in the Outline hierarchy 705 of the specific record (NO in step S1104), then the process proceeds to step S1108. In step S1108, the printing apparatus 12 executes the printing of the page number P according to the first page position (Dest) 710 and the Page tree 702. If the page list (DestList) 712b is not included in the Outline entry B 706b of B's record, then it is determined that the imposition printing is not performed. In other words, as illustrated in FIG. 4, information of one page of the record is printed on one sheet of paper.

Thus, the printing apparatus 12 extracts the first page position (Dest) 710b of the Outline entry B 706b of B's record. Since the fourth page of the physical pages is set to the first page position (Dest) 710b, the printing apparatus 12 prints the fourth page of the physical pages as the first page.

Then the process proceeds to the above-described step S1106. If the process proceeds to step S1107 and returns to step S1108 again, then the "page number P of B's record" that shows the page to be processed, will be "2". Then, the printing apparatus 12 acquires the page number of the physical pages to be printed according to the following equation (1).

page number of the physical pages to be printed=
(physical page number of the first page)+[(page
number P of the page to be processed)−1]     (1)

Since the physical page number of the first page is "4" according to the first page position (Dest) 710b, if the page number P is "2", the fifth page of the physical pages will be printed based on a following formula.

physical page number of the first page (=4)+page
number P of the page to be processed(=2)−1=5

Similarly, the sixth page of the physical pages will be printed as the third page of B's record.

Thus, the processing performed by the printing apparatus has been described in which after the generation of the variable data, the transmission of the physical imposition data to the printing apparatus 12 and the printing of the data are finished.

According to the present embodiment, when print data that contains a plurality of records is generated, the next information is generated and included in the print data. In other words, the page list (DestList) 712 is generated as the information that links each page of each record and the physical page on which the page is actually printed. The page list (DestList) 712 is generated based on the content of the variable data (e.g., the number of records and the total number of pages of each record) and the imposition printing method.

Thus, even if printing of a specific record out of a plurality of records is designated, the physical page on which each page of the record is printed can be determined. Thus, by printing the determined physical page, only the printing of the specific record can be performed. In other words, any variable data that is processed for physical imposition can be correctly printed by obtaining data for each record. Consequently, efficient processing is achieved.

Example 2

Next, a second exemplary embodiment of the present invention will be described.

Figure 13:
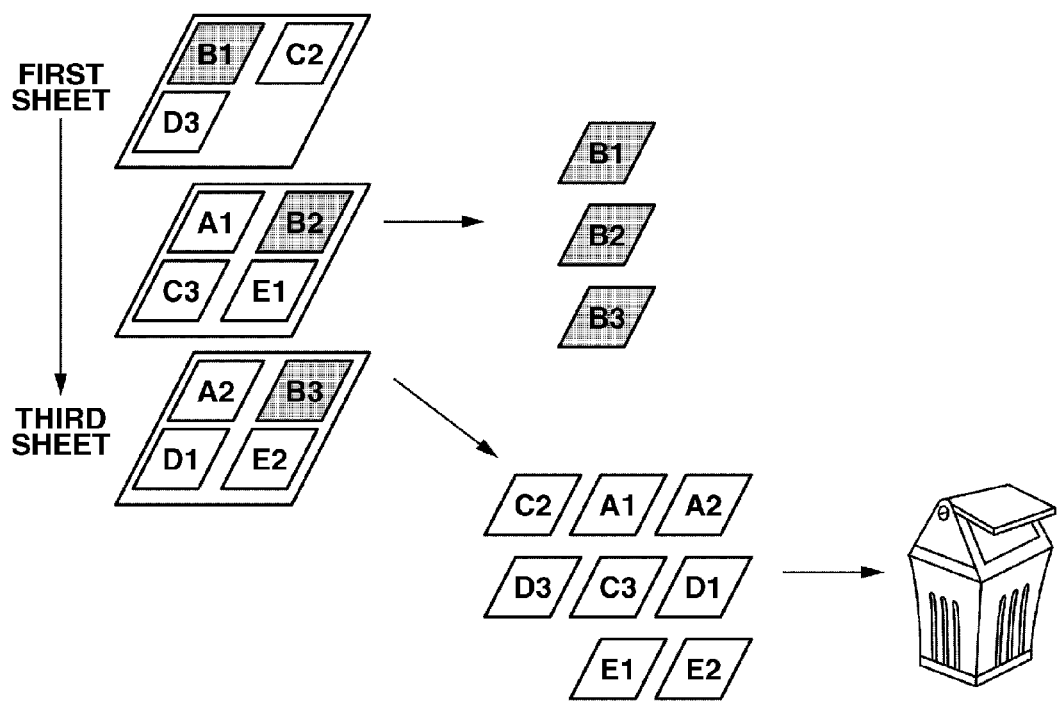
FIG. 13 illustrates an example of a result obtained when B's record is printed according to the first exemplary embodiment of the present invention.

According to the first exemplary embodiment, printing of variable data for each record is possible even if the imposition layout of a plurality of pages is set on one physical page. FIG. 13 illustrates an example where B's record is printed according to the first exemplary embodiment.

As can be seen from the illustration on the left side of FIG. 13, all the pages of B's record are obtained if the pages are printed according to the first exemplary embodiment. However, since pages from a plurality of records are printed on one physical page, some of the pages of the records other than B's record are included in the print product. Thus, if only B's record is necessary, as can be seen from the illustration on the right side of FIG. 13, B's record will be separated from others. In such a case, the pages other than those of B's record will be useless.

According to the present embodiment, only a specific record is printed on a sheet (physical page). The main difference between the present and the first embodiments is the variable print data, some content of the variable print data, some of the generation processing of the variable print data, and some of the specific record printing processing. Thus, in the present embodiment, detailed description of the components and processing that are similar to the first exemplary embodiment are omitted.

Figure 14:
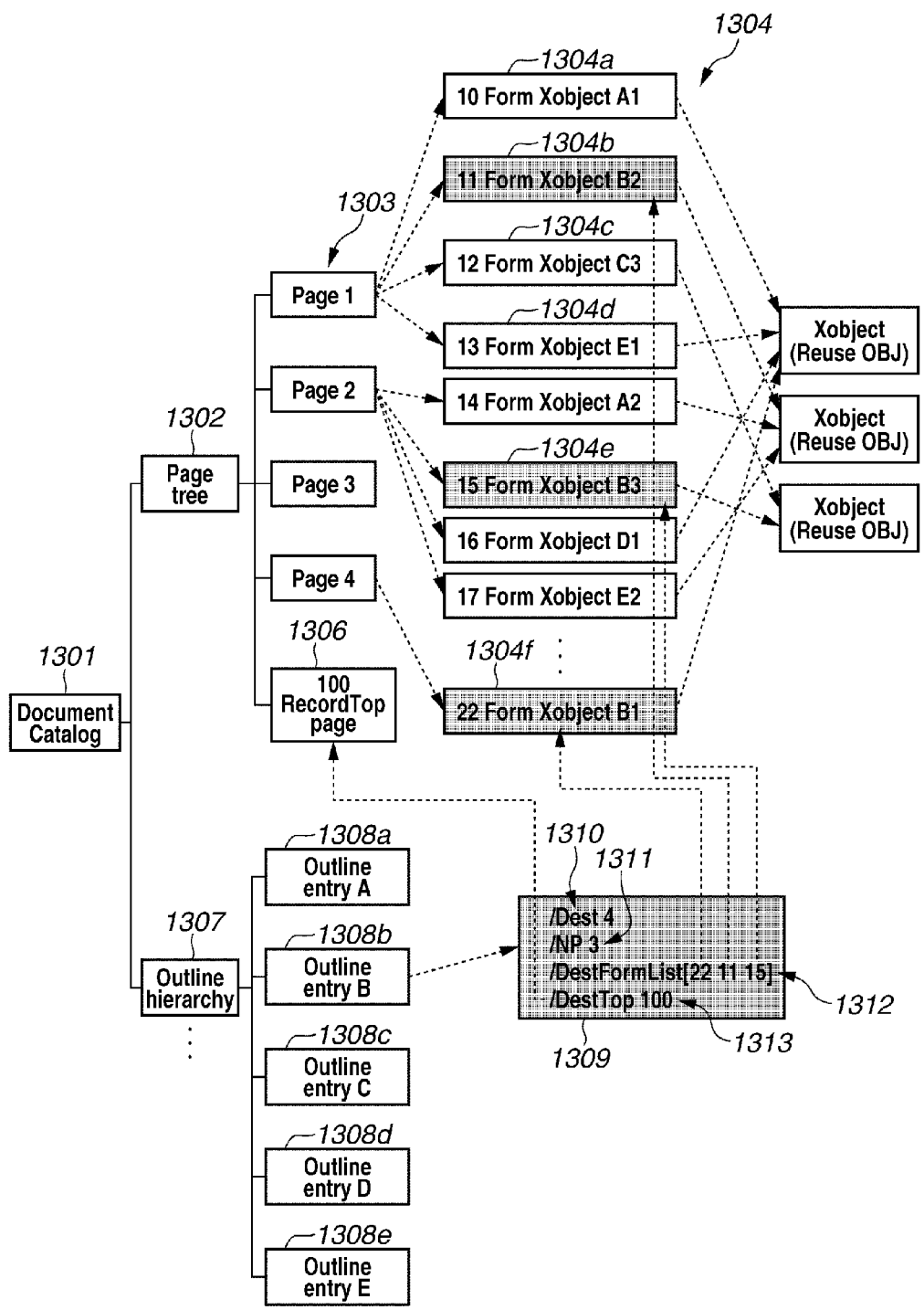
FIG. 14 illustrates an example of the variable print data according to a second exemplary embodiment of the present invention.

FIG. 14 illustrates an example of the variable print data. According to the present embodiment, the variable print data is PDF data.

As described above, a PDF document has a hierarchical structure. A Document Catalog 1301 is the root of the hierarchy. A Page tree 1302 is branched into page information. A Page 1303 includes information of a configuration of each page.

A Form Xobject 1304, which is a distinctive feature of the present embodiment, is intermediate data (intermediate resource) of each page. The Form Xobject 1304 keeps a state of a rendering object of each page of the original document as it is. It is generated based on, for example, content of variable data (e.g., rendering object) of each page of each record. Page 1303 from which the Form Xobject 1304 is branched is determined based on, for example, the content of the variable data (e.g., number of records or the number of pages of each record) and the imposition method designated by the user.

An Xobject 1305 is a rendering object used as reusable data by the Form Xobject 1304. The Xobject 1305 is a rendering object that is used commonly by each page and is also called a reusable object. The Xobject 1305 is referenced by all pages from Page 1 to Page 4.

A RecordTop page 1306 is intermediate data configuration information. The intermediate data configuration information indicates the imposition layout of the Form Xobject 1304, which is the intermediate data used for keeping the position/state of each record at the time of imposition printing of each record. The imposition layout is performed by reducing the size or moving the position of the Form Xobject 1304. The RecordTop page 1306 is generated based on, for example, the imposition printing method and the content of variable data (e.g., number of records or number of pages of each record).

An Outline hierarchy 1307 shows the position of the first page of each record. Each of an Outline entry A 1308a to an Outline entry E 1308e contains information about a position of the first page of the records of A to E and the total number pages. For example, data 1309, which is detailed information of the Outline entry B 1308b, includes a position of the first page (Dest) 1310 and total number of pages (NP) 1311.

Further, the data 1309 includes a DestFormList 1312 (intermediate data position list) which is a list of the position of the Form Xobject 1304. Furthermore, the data 1309 includes DestTop 1313 which is a page configuration information position. The DestTop 1313 is information of the position of the RecordTop page 1306, which is the intermediate data configuration information. Additionally, information such as an object number in the PDF document can be included in the data 1309.

Figure 15:
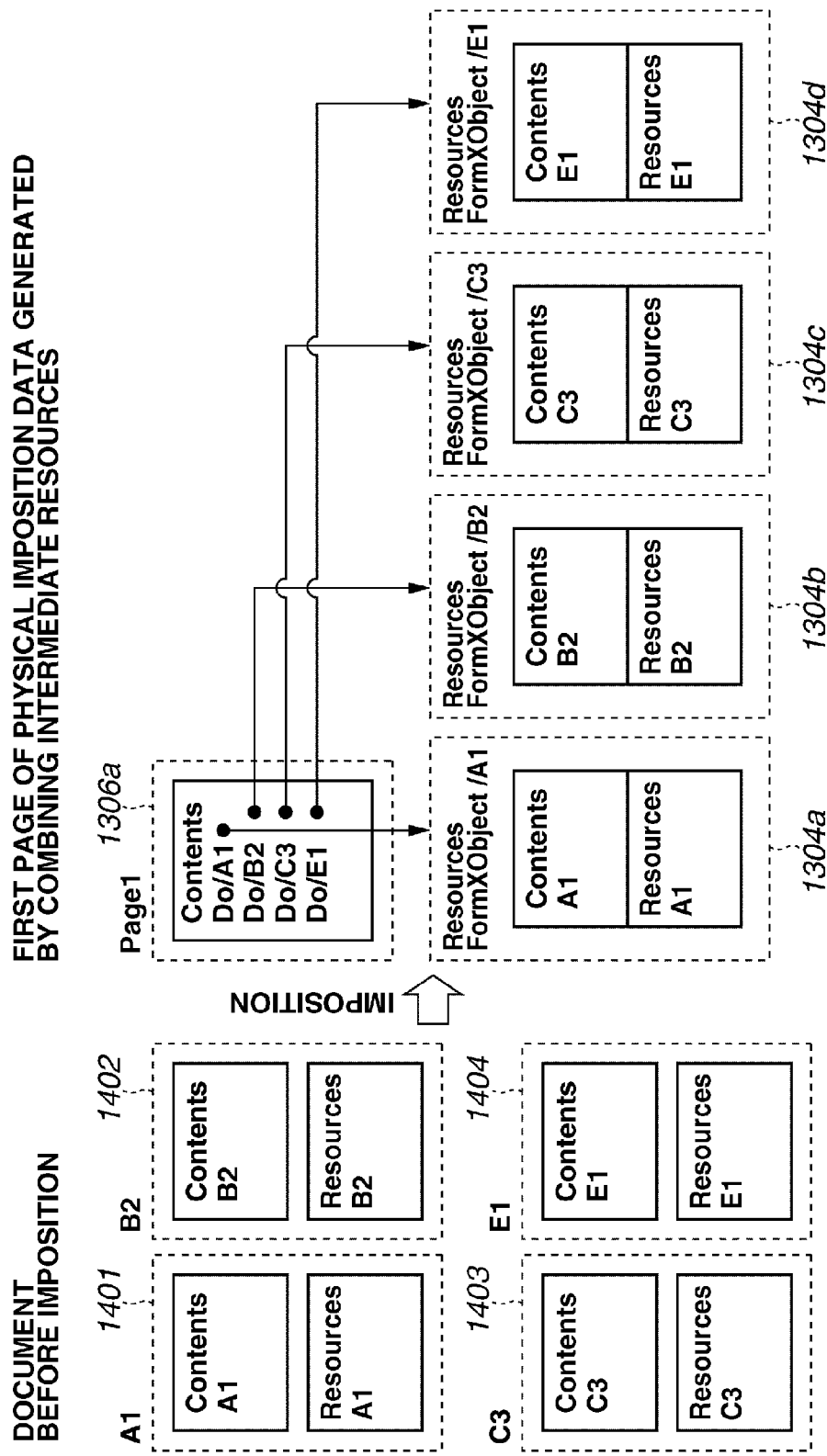
FIG. 15 is a schematic diagram of a state of a first page of the print product illustrated in FIG. 5 according to the second exemplary embodiment of the present invention.

FIG. 15 is a schematic diagram of a state of a first page of the print product illustrated in FIG. 5. The information illustrated in FIG. 15 corresponds to information of a hierarchy lower than the Page 1303 illustrated in the structural drawing of the variable print data in FIG. 14.

According to the example illustrated in FIG. 5, the first page A1 of A's record, the second page B2 of B's record, a third page C3 of C's record, and a first page E1 of E's record are printed on the first page of the physical pages. FIG. 15 illustrates each of such pages in the form of PDF. Information of each object included in a first page 1401 of A's record is kept in Contents A1, and data such as image data that is used as the object is kept in Resources A1. Information and data of a second page 1402 of B's record, a third page 1403 of C's record, and a first page 1404 of E's record is also kept in a similar manner.

In this way, intermediate data (intermediate resource) 1304a to 1304d, which keeps the state of the pages 1401 to 1404 that are printed on one physical page, is generated. A RecordTop page 1306a includes information that determines the layout of the intermediate data 1304a to 1304d on the physical page (first page), for example, whether to reduce its size or where to move its position. Regarding the original document, intermediate data (state of intermediate data) of the first page 1401 of A is a Form Xobject 1304a, intermediate data of the second page 1402 of B is a Form Xobject 1304b, intermediate data of the third page 1403 of C is a Form Xobject 1304c, and intermediate data of the first page 1404 of E is a Form Xobject 1304d.

Figure 16:
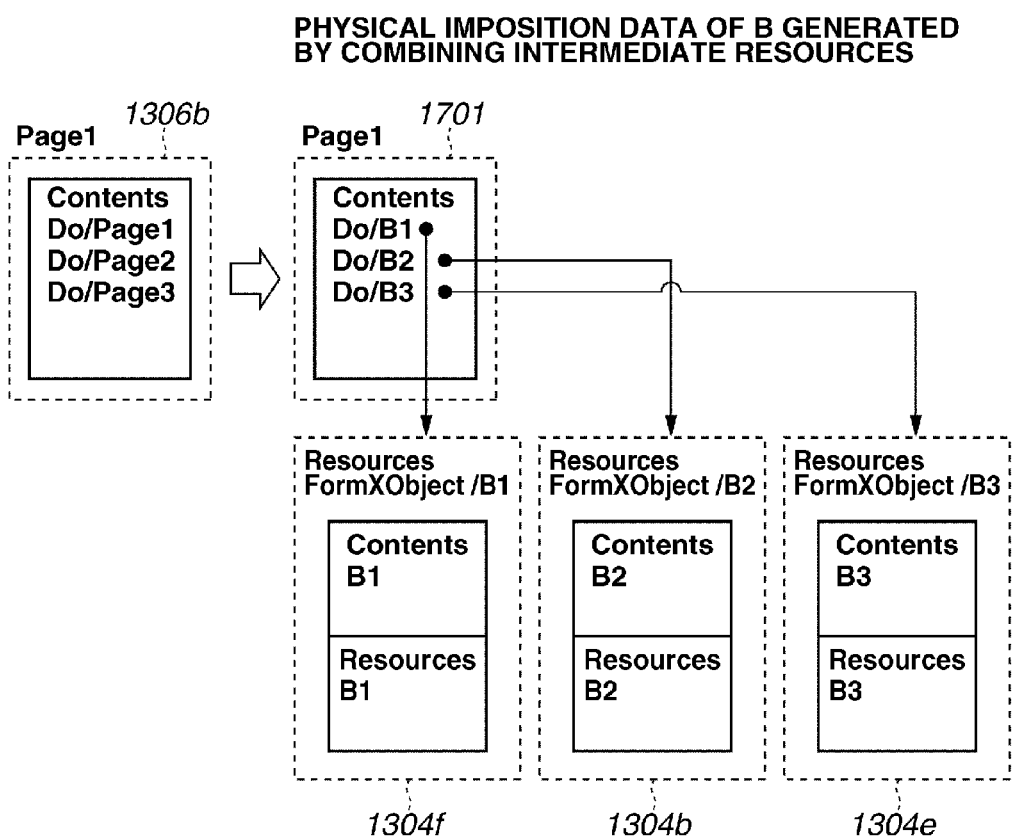
FIG. 16 is a conceptual illustration of an example of physical imposition data when only B's record is printed according to the second exemplary embodiment of the present invention.

FIG. 16 is a conceptual illustration of an example of the physical imposition data in a case where only B's record is printed.

A RecordTop page 1306b is data describing the layout of the intermediate data of each page of B's record on a physical page. A RecordTop page 1701 is data based on Contents of the RecordTop page 1306b but arranged to meet B's record. More particularly, the RecordTop page 1701 is arranged so that it meets each page of B's record (i.e., the Form Xobject 1304b, a Form Xobject 1304e, and a Form Xobject 13040. The intermediate data of B's first page is the Form Xobject 1304f, the intermediate data of B's second page is the Form Xobject 1304b, and the intermediate data of B's third page is the Form Xobject 1304e.

Referring now to the flowchart in FIG. 10, an example of the processing of the variable data print system when the variable data is generated and printed will be described.

Similar to the first embodiment, the variable data generation unit 8 generates the variable data in step S801 and determines the printing method (imposition method) in step S802. According to the present embodiment, an example of the variable data generation unit is realized by the processing in step S801. Further, an example of the determination unit is realized by the processing in step S802.

Figure 17:
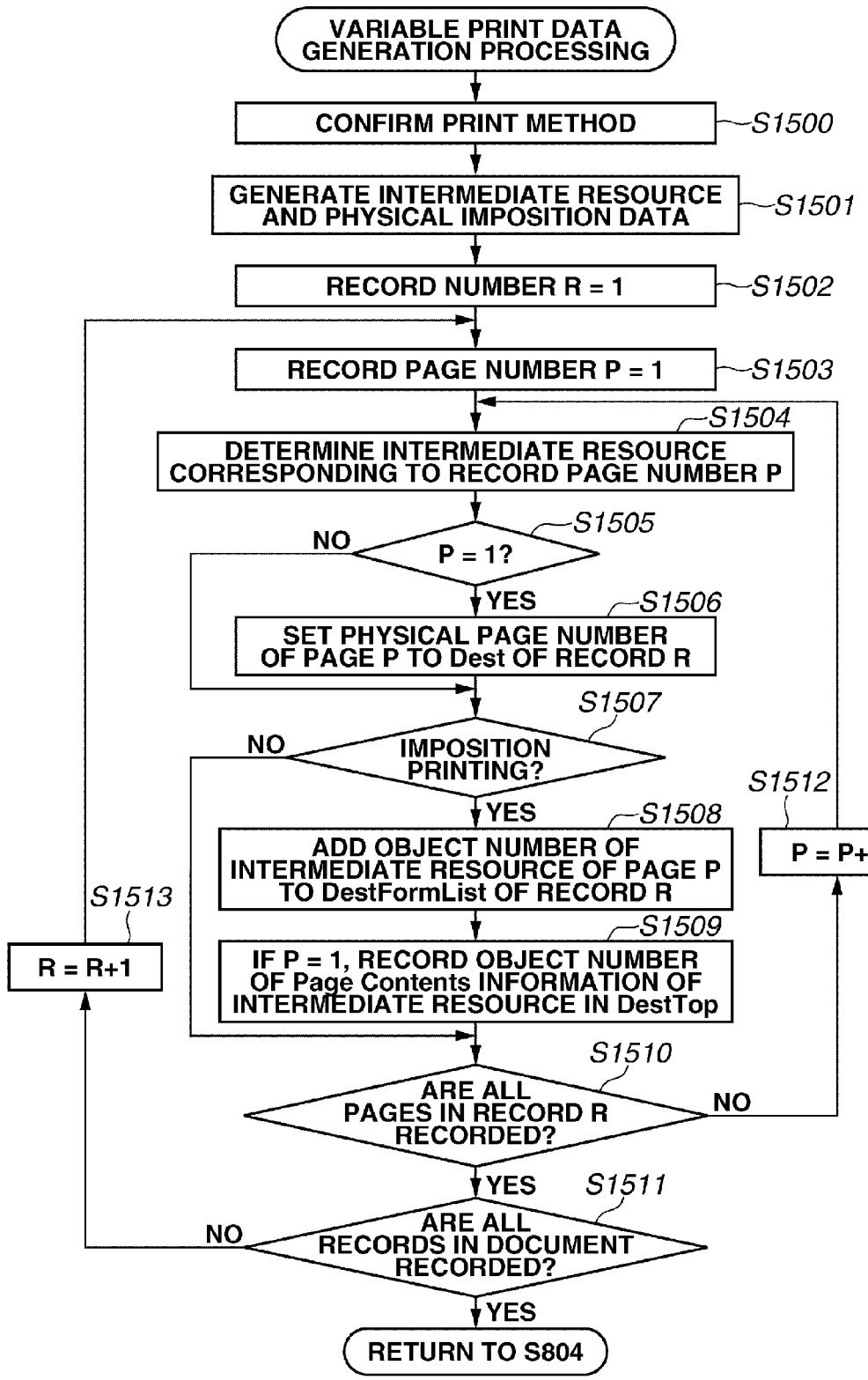
FIG. 17 is a flowchart illustrating as an example details of the variable print data generation processing in step S803 of FIG. 10 according to the second exemplary embodiment of the present invention.

In step S803, the physical imposition data generation unit 9 and the page analysis unit 10 generate the print data (physical imposition data). FIG. 17 is a flowchart illustrating in detail an example of the variable print data generation processing in step S803 of FIG. 10. As described above, the physical imposition data in FIG. 17 is PDF data. The processing illustrated in FIG. 17 is performed mainly by the physical imposition data generation unit 9. However, analysis of the layout of the process target page on the physical page, which is performed in step S1504, is performed by the page analysis unit 10.

In step S21500 of FIG. 17, the physical imposition data generation unit 9 confirms the printing method determined in step S802. In this case, the cut & stack printing illustrated in FIG. 5 is determined as the printing method. Thus, the print data used for printing the variable data, which includes five records, each of which contains three pages of data and is printed by 4-up printing (four pages are printed on one sheet) of cut & stack, is generated.

In step S1501, the physical imposition data generation unit 9 generates the intermediate data (intermediate resource) 1304 and physical imposition data (PDF data).

To be more precise, the physical imposition data generation unit 9 generates the variable print data (PDF data) illustrated in FIG. 14 other than the data 1309. Since the state of the physical imposition is kept in the Page 703 according to the first embodiment, it is not possible to obtain only the information of a specific record. According to the present embodiment, however, information of each record of the original document is maintained as the intermediate data, and the physical imposition state is expressed by a combination of the intermediate data.

A PDF document has a hierarchical structure, and the physical imposition data generation unit 9 generates data regarding the Document Catalog 1301, which is the root of the hierarchy, the Page tree 1302, which is branched into page information, and the Page 1303, which is configuration information of each page. In combination of the Form Xobject 1304, which is the intermediate data of a page and is the distinctive feature of the present embodiment, the Page 1303 shows layout information regarding reduction of size or change of position of the physical imposition.

The Form Xobject 1304 is a type of data that keeps the state of the rendering object of each page of the original document as it is.

For example, according to the example illustrated in FIG. 5, the first page A1 of A's record, the second page B2 of B's record, the third page C3 of C's record, and the first page E1 of E's record are printed on the first page of the physical pages. Information of each object included in the first page 1401 of A's record is stored in the Contents A1, and data such as image data that is used in the object is kept in the Resources A1 (see FIG. 15). Information and data of the second page 1402 of B's record, the third page 1403 of C's record, and the first page 1404 of E's record is also stored in a similar manner.

Regarding the original document, intermediate data (state of intermediate data) of the first page 1401 of A is the Form Xobject 1304a, intermediate data of the second page 1402 of B is the Form Xobject 1304b, intermediate data of the third page 1403 of C is the Form Xobject 1304c, and intermediate data of the first page 1404 of E is the Form Xobject 1304d.

Information of each object in the first page 1401 of A's record (Contents A1) and information of the data used for each object (Resources A1) remain in the Form Xobject 1304a which is intermediate data. Accordingly, when printing of each record is performed, information that is necessary in rendering each object can be obtained individually for each record.

The RecordTop page 1306a, which indicates the layout of the first page of the physical page (sheet) includes information that determines the imposition layout of the intermediate data 1304 (i.e., how to reduce size or change position). The RecordTop page 1306a is information of Page 1 in FIG. 14. In this case, the intermediate data 1304a of A's first page is printed on the upper left corner of the first page of the sheets at a reduction ratio of 50% and the intermediate data 1304b of B's second page is printed on the upper right corner of the same sheet at the same reduction ratio. Similarly, the intermediate data 1304c of C's third page is printed on the lower left corner of the same sheet at the same reduction ratio, and the intermediate data 1304d of E's first page is printed on the lower right corner of the same sheet at the same reduction ratio.

The Xobject 1305, which is used as reusable data, is a rendering object that is used commonly by each page, and also referred to as a reusable object of variable data. The Xobject 1305 is referenced by the Form Xobject 1304, which is intermediate data (intermediate resource), and indirectly referenced by all the pages from Page 1 to Page 4.

According to the present embodiment, an example of the intermediate data generation unit is realized by the process performed in step S1501.

In step S1502 in FIG. 17, the physical imposition data generation unit 9 initializes a record number R to "1".

In step S1503, the physical imposition data generation unit 9 initializes a record page number P to "1".

In step S1504, the page analysis unit 10 determines the ultimate intermediate resource of the page having the record page number P of the record having the record number R. For example, the first page 501 of B's record will be the Form Xobject 1304f which is the intermediate resource of an object number 22.

In step S1505, the physical imposition data generation unit 9 determines whether the record page number P is "1". In other words, the physical imposition data generation unit 9 determines whether the process target page is the first page of the target record. As a result, if it is determined that the process target page is the first page (YES in step S1505), the process proceeds to step S1506. If the target page is not the first page (NO in step S1505), then the process proceeds to step S1507. In this case, since B's record is the first page 501, the process proceeds to step S1506.

In step S1506, the page analysis unit 10 sets the physical page number of the record page number P to a first page position (Dest) 1310 of an Outline entry 1308 of the record number R. For example, since the first page 501 of B's record is on the fourth physical page, the page analysis unit 10 sets the first page position (Dest) 1310 of the Outline entry B 1308b of the OutLine hierarchy 1307 to "4". Further, the page analysis unit 10 sets the total number of pages of the record having the record number R to a total number of pages (NP) 1311 of the Outline entry 1308 of the record having the record number R. For example, the page analysis unit 10 sets "3" to the total number of pages (NP) 1311 of the Outline entry B 1308b of the record having the record number R.

In step S1507, the physical imposition data generation unit 9 determines whether the printing method determined in step S802 of FIG. 8 is imposition printing. As described above, the imposition printing is a printing method that allows imposition layout of a plurality of logical pages one physical page.

As a result, if it is determined that the printing method is the imposition printing (YES in step S1507), the process proceeds to step S1508. If the printing method is not the imposition printing (NO in step S1507), then the process proceeds to step S1510 without proceeding to steps S1508 and s1509. Since the cut & stack printing, which is one type of imposition printing, is determined as the printing method in this case, the process proceeds to step S1508.

In step S1508, the physical imposition data generation unit 9 performs the following processing. The physical imposition data generation unit 9 adds the object number of the intermediate resource of the page number P to the DestFormList 1312, which is the intermediate data position list included in the Outline entry 1308 of the record having the record number R. Since the intermediate data (intermediate resource) that corresponds to the first page 501 (the first page 901 in the layout) of B's record is a Form Xobject B1 1304f of an object number 22, the page analysis unit 10 sets "22" to the DestFormList 1312 of the Outline entry B 1308b of the Outline hierarchy 1307.

Further, if the page of the record is the second page 502 (the second page 902 in the layout) of B's record, then "11" will be added to the DestFormList 1312 of the Outline entry B 1308b of the OutLine hierarchy 1307. Similarly, if the page of the record is the third page 503 (the third page 903 in the layout) of B's record, then "15" will be added to the DestFormList 1312 of the Outline entry B 1308b of the OutLine hierarchy 1307. In this way, [22 11 15] is set to the intermediate data position list (DestFormList 1312) that indicates the relation between the page in B's record and the intermediate resource, and the intermediate data position list (DestFormList 1312) is completed. The printing apparatus 12 can identify the intermediate data (Form Xobject 1304) of each page of each record by referring to the intermediate data position list (DestFormList 1312).

In step S1509, if the record page number P is "1" (P=1), the physical imposition data generation unit 9 sets the object number of the page configuration information Page Contents that includes the intermediate resource of the record of the record number R, to the DestTop.

The object number of the RecordTop page 1306b, which is the page configuration information Page Contents that includes the intermediate resource of B's record, is set to "100" in the present case (see FIG. 14). Accordingly, the page analysis unit 10 sets "100" to the DestTop 1313 of the Outline entry B 1308b of the OutLine hierarchy 1307.

If the record page number P is not "1", the process in step S1509 is skipped and the process proceeds to step S1510. Since the RecordTop page 1306b is determined according to the DestTop 1313, the printing apparatus 12 can identify the layout on the physical page on which the intermediate data (Form Xobject 1304) of each record is actually printed.

In step S1510, the physical imposition data generation unit 9 determines whether the content of data 1309 is set to all the pages in the record having the record number R. As a result, if it is determined that the content of the data 1309 is set to all the pages in the record (YES in step S1510), the generation of "the first page (Dest) 1310, the total number of pages (NP) 1311, the DestFormList 1312, and the DestTop 1313" of the process target records is finished and the process proceeds to step S1511. If the content of the data 1309 is not set to all the pages in the record (NO in step S1510), then the process proceeds to step S1512.

In step S1511, the physical imposition data generation unit 9 determines whether the content of the data 1309 is set to all the process target records in the document. As a result, if it is determined that the content of the data 1309 is set to all the process target records (YES in step S1511), the generation of "the first page (Dest) 1310, the total number of pages (NP) 1311, the DestFormList 1312, and the DestTop 1313" of the process target records is finished. Thus, the process of the flowchart illustrated in FIG. 17 ends, and the process proceeds to step S804 in FIG. 10. On the other hand, if all the content of the data 1309 is still not set to all the records to be processed, then the process proceeds to step S1513.

If the process proceeds from step S1510 to S1512 as described above, the physical imposition data generation unit 9 adds "1" to the record page number P, and performs processing of a page having the next page number, and then the process returns to step S1504. For example, if the processing of the first page 502 (the first page 902 in the layout) of B's record is completed, processing of the page having the page number "2" ("1" added to the current record page number P (=1)) will be performed in step S1504. Then, in step S1504, the page analysis unit 10 determines the intermediate data (intermediate resource) having the second page 502 (the second page 902 in the layout) of B's record.

Further, if the process proceeds from step S1511 to S1513, the physical imposition data generation unit 9 adds "1" to the record number R, and performs processing of a record having the next record number. For example, if the processing of B's record is completed, then "1" will be added to the current record number R ("2" in this case) and a record having the record number "3" will be processed. Then, the process returns to step S1503. In step S1503, the processing of C's record will be performed starting from C's first page.

According to the present embodiment, for example, by performing the process, for example, in step S803, an example of the print data generation unit is realized.

When the process in step S803 that is described in detail in FIG. 17, ends, the process proceeds to step S804 in FIG. 10.

In step S804, the physical imposition data (PDF data) that is generated as described above is sent from the host PC 100 to the printing apparatus 12. The printing apparatus 12 performs printing based on the obtained physical imposition data.

If the printing method is not the imposition printing, the printing apparatus 12 prints all the pages in order starting from the Page 1303 that is in the lower level of the hierarchy than a Pagetree 1302 of the Document Catalog 1301.

Figure 18:
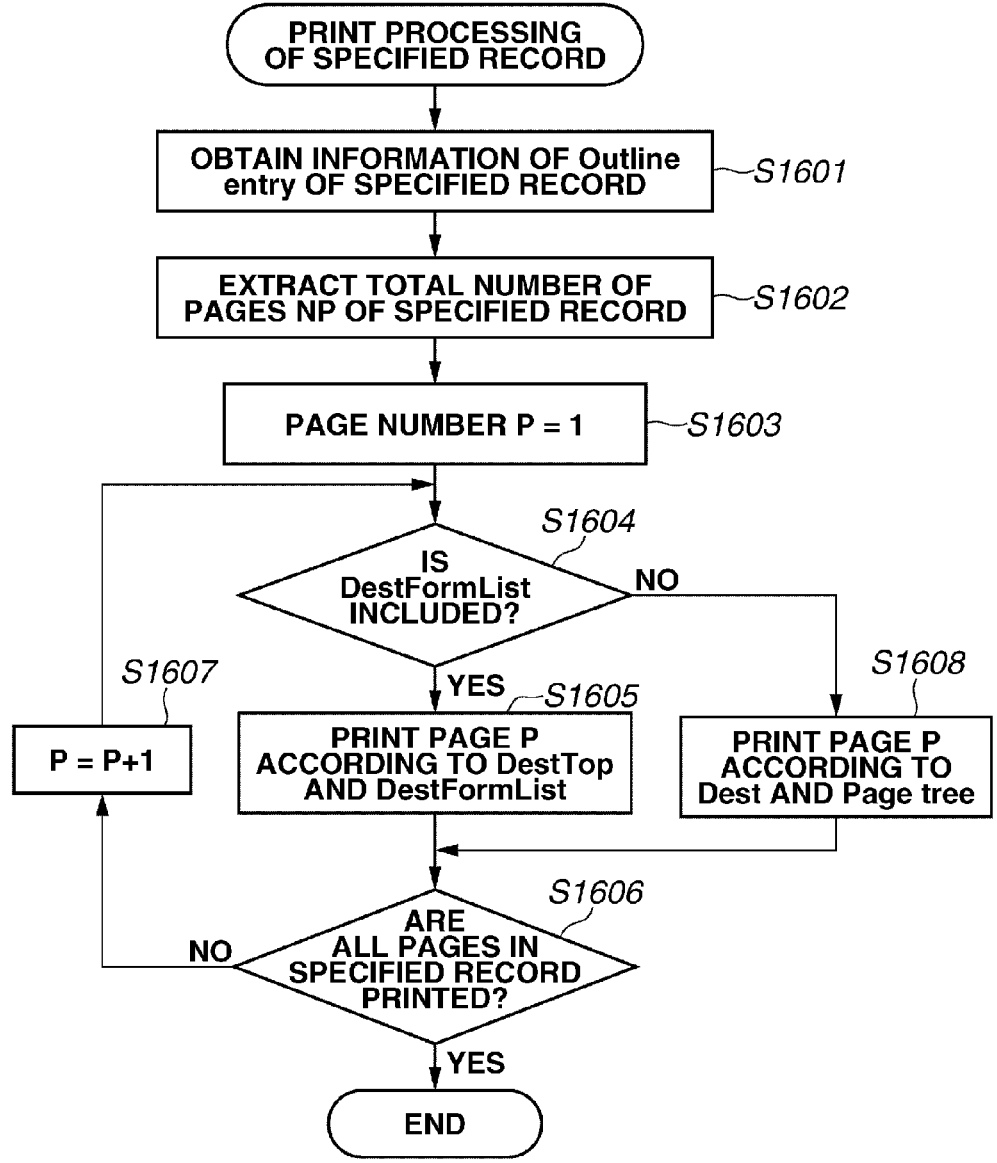
FIG. 18 is a flowchart illustrating an example of processing of the printing apparatus when a specific record out of a plurality of records is determined to be printed by imposition printing according to the second exemplary embodiment of the present invention.

On the other hand, if the imposition printing of a specific record out of a plurality of records is designated, the printing apparatus 12 performs the print processing based on the flowchart illustrated in FIG. 18. This processing is one of distinctive features of the present embodiment. The flowchart in FIG. 18 illustrates an example of the processing of the printing apparatus 12 when a specific record out of a plurality of records is determined to be printed by the imposition printing. The specific record can be one record or a plurality of records.

In step S1601 in FIG. 12, the printing apparatus 12 obtains information of the Outline entry 1308 of the specific record. In the present case, B's record is designated for printing as one example. Accordingly, the printing apparatus 12 obtains information of the Outline entry B 1308b of the Outline hierarchy 1307.

In step S1602, the printing apparatus 12 extracts the total number of pages (NP) 1311 of the specific record. Since B's record is printed in this case, the total number of pages (NP) 1311 (i.e., "3" in this case) of the Outline entry B 1308b of the Outline hierarchy 1307 is extracted. In this way, the printing apparatus 12 determines that the total number of pages of B's record is three.

In step S1603, the printing apparatus 12 sets the page number P to "1". In step S1604, the printing apparatus 12 determines whether the intermediate data position list (DestFormList) 1312 is included in the Outline entry 1308 of the Outline hierarchy 1307 of the specific record. If the intermediate data position list (DestFormList) 1312 is included (YES in step S1604), the process proceeds to step S1605. If the intermediate data position list (DestFormList) 1312 is not included (NO in step S1604), then the process proceeds to step S1608. Since the intermediate data position list (DestFormList) 1312 is included in the Outline entry B 1308b of the Outline hierarchy 1307 of B's record, the process proceeds to step S1605.

In step S1605, the printing apparatus 12 prints the page of the page number P according to the content of the DestTop 1313 and the DestFormList 1312. The RecordTop page 1306*b* of the intermediate data configuration information that describes the layout of B's record is at object number 100.

Further, the intermediate data of the first page 501 (the first page 901 in the layout) of B's record is determined as the intermediate data of object number 22 (Form Xobject B1 1304f) from the DestFormList 1312 of the Outline entry B 1308*b*. Similarly, the intermediate data of the second page 502 (the second page 902 in the layout) of B's record is determined as the intermediate data of object number 11 (Form Xobject B2 1304*b*) from the DestFormList 1312 of the Outline entry B 1308*b*. Furthermore, the intermediate data of the third page 503 (the third page 903 in the layout) of B's record is determined as the intermediate data of object number 15 (Form Xobject B3 1304*e*) from the DestFormList 1312 of the Outline entry B 1308*b*.

Then, the printing apparatus 12 assigns the intermediate data in order, to Page 1, Page 2, and Page 3 of the Contents in the RecordTop page 1306*b*. To be more precise, Page 1 in the RecordTop page 1306*b* is replaced by B1 (Form Xobject B1 1304*f*), Page 2 is replaced by B2 (Form Xobject B2 1304*b*), and Page 3 is replaced by B3 (Form Xobject B3 1304*e*). In this way, the RecordTop page 1306*b* is changed to the RecordTop page 1701 (see FIG. 16).

Then, the printing apparatus 12 prints the record of B according to the RecordTop page 1701. In this way, all the pages of B's record are printed.

When the process in step S1605 ends, the process proceeds to step S1606. In step S1606, the printing apparatus 12 determines whether all the pages in the specific record are printed. As a result of the determination, if printing of all the pages in the specific record is completed (YES in step S1606), the processing (print processing) of the flowchart in FIG. 18 ends. If printing of all the pages in the specific record is not completed (NO in step S1606), then the process proceeds to step S1607.

In step S1607, the printing apparatus 12 adds "1" to the current page number P and proceeds to the print processing of the next page. For example, if the printing of the first page 501 (the first page 901 in the layout) of B's record is completed, processing of the page having the page number "2" ("1" added to the current record page number P (=1)) will be performed in step S1604. Then, print processing similar to that of the first page 501 (the first page 901 in the layout) will be performed on the second page 502 (the second page 902 in the layout).

In step S1604, if the intermediate data position list (DestFormList) 1312 is determined as not included in the Outline entry 1308 in the Outline hierarchy 1307 of the specific record (NO in step S1604), then the process proceeds to step S1608. In step S1608, the printing apparatus 12 executes the printing of the page P according to the first page position (Dest) 1310 and the Page tree 1302. Since the intermediate data position list (DestFormList) 1312 is not included in the Outline entry B 706*b* of B's record in the present case, it is determined that the imposition printing is not performed. In other words, as illustrated in FIG. 4, information of one page of the record is printed on one sheet of paper.

Thus, the printing apparatus 12 extracts the first page position (Dest) 1310 of the Outline entry B 1308*b* of B's record. Since the fourth page of the physical pages is set to the first page position (Dest) 1310, the printing apparatus 12 prints the fourth page of the physical pages as the first page.

If the process proceeds to the above-described steps S1606 and S1607 and returns again to step S1608, then "the page number P of B's record" that indicates the page to be processed will be "2".

Then, the printing apparatus 12 obtains the physical page numbers to be printed according to the above-described equation (1).

Since the physical page number of the first page is "4" according to the first page position (Dest) 1310, if the page number P is "2", the fifth page of the physical pages will be printed.

Similarly, the sixth page of the physical pages will be printed as the third page of B's record.

As described above, the processing performed by the printing apparatus includes the generation of the variable data, the transmission of the physical imposition data to the printing apparatus 12, and then the printing of the data.

According to the present embodiment, when print data that contains a plurality of records is generated, the next information is generated and included in the print data. In other words, the Form Xobject 1304, which is the intermediate data that represents the state of the rendering object of each page of each record, is generated. Additionally, the intermediate data position list (DestFormList) 1312, which is used for identifying the intermediate data (Form Xobject 1304) of each page of each record, is generated. Further, the intermediate data configuration information (RecordTop page 1306) that shows the layout of the intermediate data (Form Xobject 1304) of each record on a physical page (sheet) is generated.

Thus, even if printing of a specific record out of a plurality of records is designated, only the intermediate data of the specific record is obtained and only the object of the specific record can be printed. Consequently, the processing that is even more efficient than the first exemplary embodiment is possible.

According to the second exemplary embodiment, printing of the variable print data is performed based on the flowchart illustrated in FIG. 18. In step S1605, the page of the page number P is printed according to the DestTop 1313 and the DestFormList 1312. However, if there is no DestTop 1313, the page configuration information can use the Page 1303 in place of the DestTop 1313.

In FIG. 14, Page 1 that represents one page of the physical imposition data (variable print data) includes the intermediate resource that corresponds to each page of each record of the original document. In other words, Page 1 includes intermediate resources that correspond to each page of each record of the original document such as the Form Xobject A1, Form Xobject B2, Form Xobject C3, and Form Xobject E1.

As an alternate version of the second exemplary embodiment, the printing apparatus 12 can identify the variable data that is arranged on each physical page by referring to the Form Xobject 1304 when all the variable data (all records) is printed by the imposition method designated by the user. Thus, according to the present embodiment, for example, when only B's record is printed, the intermediate resource of the content of Page 1 is replaced in order according to the DestFormList 1312 and printed. In other words, the Form Xobject A1 is replaced by Form Xobject B1 and the Form Xobject C3 is replaced by Form Xobject B3. Since the Form Xobject that corresponds to the Form Xobject E1 does not exist, the Form Xobject E1 is deleted. Then, according to the replaced content of Page 1, only B's record is printed.

In this way, if the RecordTop page 1306 and the DestTop 1313 used for the combination of the intermediate data for each record is not included in the variable print data, an effect similar to that obtained from the second exemplary embodiment can be obtained.

According to the above-described exemplary embodiments, printing of the variable print data is processed by the printing apparatus 12. However, the host PC 100 can also process the variable print data using a module that manages print jobs. For example, if printing of only B's record is designated, the host PC 100 can change the print job to that for printing only B's print data (PDF data) and transmit it to the printing apparatus 12. In this way, an effect similar to those obtained by the first and the second exemplary embodiments can be obtained.

The present invention includes a case where the functions of the above-described exemplary embodiments are realized when a software program is supplied to a system or an apparatus directly or from a remote location, and a computer of the system or the apparatus executes the supplied program code to realize the functions of the above-described exemplary embodiments. In this case, the supplied program corresponds to the flowcharts illustrated in FIGS. 10 to 12, 17, and 18 of the above-described exemplary embodiments.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). And plural CPUs and MPUs may be used for a particular computer of a system or particular apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

The invention claimed is:

1. A print control apparatus configured to process variable data that includes stationary content and variable content for printing, the print control apparatus comprising:
    a receiving unit configured to receive a request from a user to print a group of records;
    a determination unit configured to determine whether an imposition printing method or a printing method other than an imposition printing method is designated for the group of records in response to the request received from the user, wherein the imposition printing method is used to define a layout of a plurality of logical pages of the variable data to be arranged on one physical page, and wherein the plurality of logical pages includes stationary content used for a plurality of records and variable content that differs for each record of the plurality of records; and
    a print data generation unit configured to acquire information and generate print data that contains the group of records,
    wherein, in response to the determining unit determining that an imposition printing method is designated for the group of records, the print data generation unit generates, according to the designated imposition printing method, print data that includes information of a first page of each record and of a number of pages in each record,
    wherein the print data generation unit further is configured to acquire relation information that identifies a relation between logical pages in each record and physical pages on which each logical page of each record is to be printed as designated by the determined imposition printing method, and to include the acquired relation information in the print data with the information of a first page of each record and of a number of pages in each record,
    wherein the acquired relation information in the generated print data is configured such that a user can cause a printing apparatus receiving the print data to print physical pages containing only logical pages of a specific record from the group of records contained in the print data, even where the print data specifies that a logical page of the specific record and a logical page of another record in the group of records are to be printed on the same physical page.

2. The print control apparatus according to claim 1, further comprising an intermediate data generation unit configured to generate intermediate data, wherein, in response to the determining unit determining that an imposition printing method is designated for the group of records, the intermediate data generation unit is configured to generate, for each logical page of each record, intermediate data used for keeping a state of each logical page of each record, wherein the print data generation unit generates information used for identifying the intermediate data of each record of each logical page and generates the print data including the generated information,
    wherein the generated information is configured such that a user can cause a printing apparatus receiving the print data to print only pages of a specific record from the group of records contained in the print data without printing pages of other records contained in the print data, even where the print data specifies that a logical page of the specific record and a logical page of another record in the group of records are to be printed on the same physical page.

3. The print control apparatus according to claim 2, wherein the print data generation unit generates the print data further including information of layout about the physical page on which the intermediate data of each record is actually to be printed.

4. The print control apparatus according to claim 2, wherein the print data generation unit generates, in a case where the record of the variable data is to be printed by using the imposition printing method determined by the determination unit, information used for identifying the variable data arranged on each physical page based on the variable data and the imposition printing method determined by the determination unit, and generates the print data that further includes the generated information.

5. A print control method for controlling a print control apparatus configured to process variable data that includes stationary content and variable content for printing, the print control method comprising:
    receiving a request from a user to print a group of records;
    determining, with a processor, whether an imposition printing method or a printing method other than an imposition printing method is designated for the group of records in response to the request received from the user, wherein the imposition printing method is used to define a layout of a plurality of logical pages of the variable data to be arranged on one physical page, and wherein the plurality of logical pages includes stationary content used for a plurality of records and variable content that differs for each record of the plurality of records; and acquiring information and generating print data that contains the group of records, wherein, in response to determining that an imposition printing method is designated for the group of records, generating, according to the designated imposition printing method, print data that includes information of a first page of each record and of a number of pages in each record, wherein acquiring further includes acquiring relation information that identifies a relation between logical pages in each record and physical pages on which each logical page of each record is to be printed as designated by the determined imposition printing method, and including the acquired relation information in the print data with the information of a first page of each record and of a number of pages in each record, wherein the acquired relation information in the generated print data is configured such that a user can cause a printing apparatus receiving the print data to print physical pages containing only logical pages of a specific record from the group of records contained in the print data, even where the print data specifies that a logical page of the specific record and a logical page of another record in the group of records are to be printed on the same physical page.

6. The print control method according to claim 5, further comprising generating intermediate data, wherein, in response to determining that an imposition printing method is designated for the group of records, generating intermediate data includes generating, for each logical page of each record, intermediate data used for keeping a state of each logical page of each record, wherein generating includes generating information used for identifying the intermediate data of each record of each logical page and generates the print data including the generated information, wherein the generated information is configured such that a user can cause a printing apparatus receiving the print data to print only pages of a specific record from the group of records contained in the print data without printing pages of other records contained in the print data, even where the print data specifies that a logical page of the specific record and a logical page of another record in the group of records are to be printed on the same physical page.

7. The print control method according to claim 6, further comprising generating the print data further including information of layout about the physical page on which the intermediate data of each record is actually to be printed.

8. The print control method according to claim 6, wherein generating includes generating, in a case where the record of the variable data is to be printed by using the determined imposition printing method, information used for identifying the variable data arranged on each physical page based on the variable data and the determined imposition printing method, and generating the print data that further includes the generated information.

9. A non-transitory computer-readable storage medium storing a computer-executable program causing a computer to execute the print control method according to claim 5.

10. The print control apparatus according to claim 1, further comprising a print control unit configured transmit, in the case where a specific record included in the variable data is designated, data to cause the print unit to print only a physical page including the designated specific record from among physical pages included in the print data in accordance with the information for identifying the physical page on which each logical page of each record included in the variable data is printed.

11. The print control apparatus according to claim 10, wherein the print control unit transmits data to cause the print unit to print the physical page including the specific record not in an order of the physical pages but in an order of logical pages included in the specific record.

12. The print control apparatus according to claim 10, wherein the designated specific record is plural records.

13. A print control apparatus configured to process variable data that includes stationary content and variable content for printing, the print control apparatus comprising:
    a receiving unit configured to receive print data that contains a group of records and a request to print a specific record from the group of records;
    an obtaining unit configured to obtain an outline entry for the specific record;
    a determination unit configured to determine whether an imposition printing method is designated for the group of records in response to receiving the request to print the specific record from among the group of records, wherein a layout arranged on one physical page includes a plurality of logical pages in which stationary content for a plurality of records and variable content that differs for each record is used, wherein, in response to the determination unit determining that an imposition printing method is designated for the group of records, the print control apparatus
    acquires relation information from the received print data, and
    generates new print data to print physical pages containing only logical pages of the specific record according to the acquired relation information,
    wherein the imposition printing method is used to define a layout of the variable data, and
    wherein the relation information had been output by the determined imposition printing method and identifies a relation between logical pages in the specific record and physical pages on which each logical page of the specific record is to be printed as designated by the imposition printing method.

14. The print control apparatus according to claim 13, wherein, in response to the determination unit determining that an imposition printing method is not designated for the group of records, the print control apparatus generates new print data to print pages of the specific record in an order specified by a printing method other that an imposition printing method.

15. The print control apparatus according to claim 14, wherein the printing method other that an imposition printing method uses data in a document having a hierarchical structure, and wherein the print control apparatus generates the new print data to print pages of the specific record in an order specified at a level in the hierarchical structure that is lower than a page tree level in the hierarchical structure.

16. The print control apparatus according to claim 13, wherein the specific record is a plurality of records from the group of records.

* * * * *